(12) United States Patent
Kwon et al.

(10) Patent No.: US 9,935,329 B2
(45) Date of Patent: Apr. 3, 2018

(54) STEPPED ELECTRODE GROUP STACK

(71) Applicant: LG CHEM, LTD., Seoul (KR)

(72) Inventors: Sungjin Kwon, Daejeon (KR);
Dong-Myung Kim, Daejeon (KR);
Kiwoong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 141 days.

(21) Appl. No.: 14/442,188

(22) PCT Filed: Feb. 12, 2014

(86) PCT No.: PCT/KR2014/001147
§ 371 (c)(1),
(2) Date: May 12, 2015

(87) PCT Pub. No.: WO2014/126382
PCT Pub. Date: Aug. 21, 2014

(65) Prior Publication Data
US 2015/0349382 A1    Dec. 3, 2015

(30) Foreign Application Priority Data
Feb. 15, 2013    (KR) ........................ 10-2013-0016452

(51) Int. Cl.
*H01M 10/0585*    (2010.01)
*H01M 10/04*    (2006.01)
(Continued)

(52) U.S. Cl.
CPC ..... *H01M 10/0413* (2013.01); *H01M 10/045* (2013.01); *H01M 10/0431* (2013.01);
(Continued)

(58) Field of Classification Search
CPC ......... H01M 10/0585; H01M 10/0413; H01M 10/0436; H01M 10/045; H01M 10/0583; H01M 10/0587; H01M 10/0431; H01M 10/0463; H01M 10/052; H01M 2010/4292
USPC .................................................. 429/94, 152
See application file for complete search history.

(56) References Cited

U.S. PATENT DOCUMENTS 6,224,995 B1    5/2001    Fauteux et al.
6,258,478 B1    7/2001    Kim
(Continued)

FOREIGN PATENT DOCUMENTS

EP    1 488 917 A1    12/2004
JP    9-293536 A    11/1997
(Continued)

OTHER PUBLICATIONS

International Search Report issued in PCT/KR2014/001147, dated May 20, 2014.

*Primary Examiner* — Osei K Amponsah
(74) *Attorney, Agent, or Firm* — Birch, Stewart, Kolasch & Birch, LLP (57) ABSTRACT

Disclosed herein is an electrode group stack including a stacked structure of electrode groups, each including a positive electrode, a negative electrode, and a separator disposed between the positive electrode and the negative electrode, in which the electrode groups are stacked in a height direction on the basis of a plane such that the positive electrode and the negative electrode face each other in a state in which the separator is disposed between the positive electrode and the negative electrode, wherein the stacked structure of the electrode groups includes electrode groups having different areas at an interface between the electrode groups, and a ratio of capacity to area of the positive electrode and the negative electrode at the interface between the electrode groups (N/P ratio) is equal to or greater than a ratio of capacity to area of a positive electrode and a negative electrode constituting an electrode group having a relatively large area (N/P ratio).

29 Claims, 6 Drawing Sheets

(51) Int. Cl.
*H01M 10/0583* (2010.01)
*H01M 10/0587* (2010.01)
*H01M 10/052* (2010.01)
*H01M 10/42* (2006.01)

(52) U.S. Cl.
CPC ... *H01M 10/0436* (2013.01); *H01M 10/0463* (2013.01); *H01M 10/052* (2013.01); *H01M 10/0583* (2013.01); *H01M 10/0585* (2013.01); *H01M 10/0587* (2013.01); *H01M 2010/4292* (2013.01)

(56) References Cited

U.S. PATENT DOCUMENTS

2011/0183183 A1    7/2011   Grady et al.
2012/0321924 A1*   12/2012   Ahn ................... H01M 2/022
                                                        429/94

FOREIGN PATENT DOCUMENTS

| | | |
|---|---|---|
| JP | 11-214027 A | 8/1999 |
| JP | 2001-28275 A | 1/2001 |
| JP | 2003-234094 A | 8/2003 |
| JP | 2003-282142 A | 10/2003 |
| JP | 2004-111219 * | 4/2004 |
| JP | 2004-111219 A | 4/2004 |
| JP | 3680797 B2 | 8/2005 |
| JP | 2010-238451 A | 10/2010 |
| JP | 2013-12320 A | 1/2013 |
| JP | 2013-518394 A | 5/2013 |
| KR | 10-0274884 B1 | 12/2000 |
| KR | 10-2013-0014252 A | 2/2013 |

* cited by examiner

STEPPED ELECTRODE GROUP STACK

TECHNICAL FIELD

The present invention relates to an electrode group stack mounted in a battery case of a secondary battery, and more particularly to a stepped electrode group stack.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place.

Lithium secondary batteries are very important to realize such a ubiquitous society. Specifically, lithium secondary batteries, which can be charged and discharged, have been widely used as an energy source for wireless mobile devices. In addition, the lithium secondary batteries have also been used as an energy source for electric vehicles and hybrid electric vehicles, which have been proposed to solve problems, such as air pollution, caused by existing gasoline and diesel vehicles using fossil fuel.

As devices, to which the lithium secondary batteries are applicable, are diversified as described above, the lithium secondary batteries have also been diversified such that the lithium secondary batteries can provide outputs and capacities suitable for devices to which the lithium secondary batteries are applied. In addition, there is a strong need to reduce the size and weight of the lithium secondary batteries.

Small-sized mobile devices, such as mobile phones, personal digital assistants (PDAs), digital cameras, and laptop computers, use one or several small-sized, lightweight battery cells for each device according to the reduction in size and weight of the corresponding products.

On the other hand, middle or large-sized devices, such as electric bicycles, electric motorcycles, electric vehicles, and hybrid electric vehicles, use a middle or large-sized battery module (middle or large-sized battery pack) having a plurality of battery cells electrically connected with each other because high output and large capacity are necessary for the middle or large-sized devices.

The size and weight of the battery module are directly related to a battery module receiving space and output of a corresponding middle or large-sized device. For this reason, manufacturers are trying to manufacture small and lightweight battery modules.

A cylindrical battery cell, a prismatic battery cell, and a pouch-shaped battery cell, which are classified based on their shapes, are used as a stacked type electrode group of the battery module or the battery pack. Among these battery cells, the pouch-shaped battery cell, which can be stacked with high integration, has a high energy density per weight, is inexpensive, and can be easily modified, has attracted considerable attention.

Figure 1:
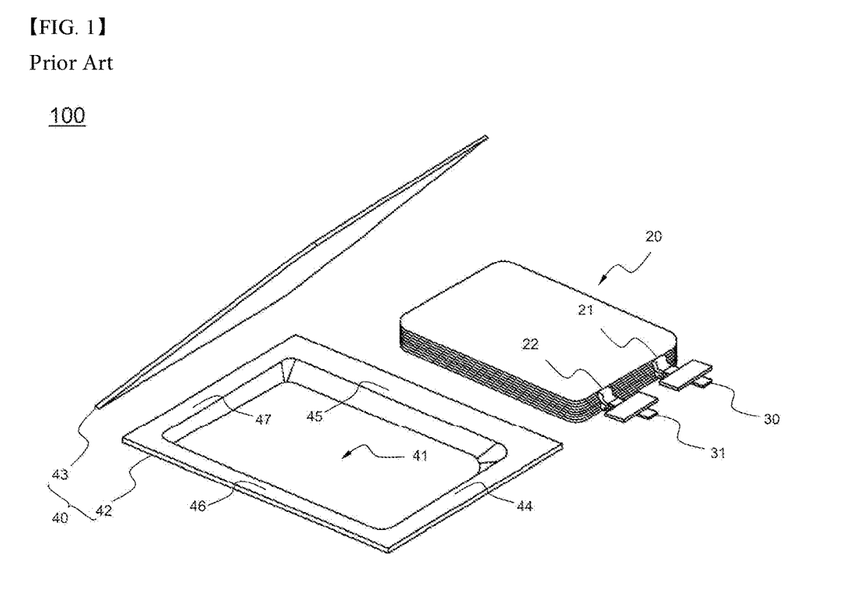
FIGS. 1 and 2 are exploded perspective views showing a conventional representative pouch-shaped secondary battery.
Figure 2:
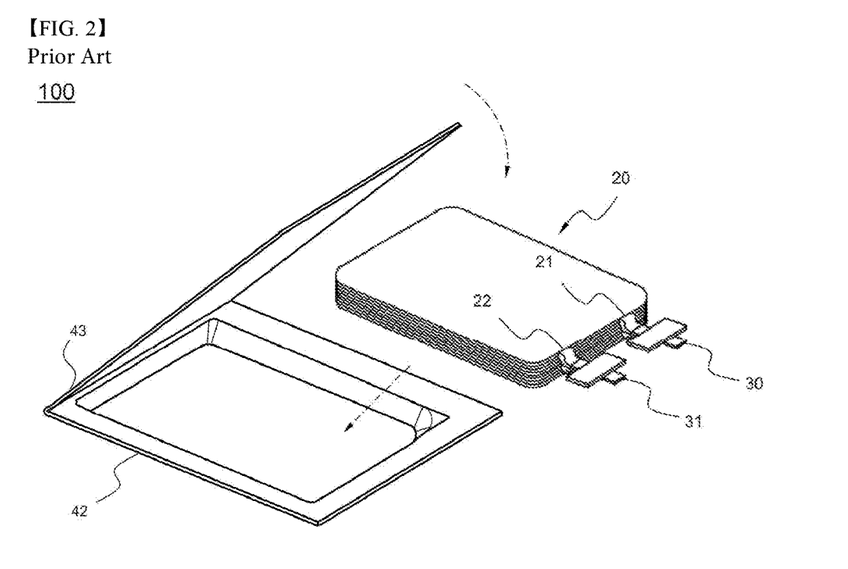

FIGS. 1 and 2 are exploded perspective views typically showing a general structure of a conventional representative pouch-shaped secondary battery.

Referring to FIG. 1, a pouch-shaped secondary battery 100 includes an electrode assembly 20 having pluralities of electrode tabs 21 and 22 protruding therefrom, two electrode leads 30 and 31 respectively connected to the electrode tabs 21 and 22, and a battery case 40, in which the electrode assembly 20 is received in a sealed state such that the electrode leads 30 and 31 are partially exposed outward from the battery case 40.

The battery case 40 includes a lower case 42 having a depressed receiving part 41, in which the stacked type electrode assembly 20 is located, and an upper case 43 for covering the lower case 42 such that the electrode assembly 20 is sealed in the battery case 40. The upper case 43 and the lower case 42 are connected to each other by thermal welding in a state in which the electrode assembly 20 is mounted therein to form an upper end sealed part 44, side sealed parts 45 and 46, and a lower end sealed part 47.

As shown in FIG. 1, the upper case 43 and the lower case 42 may be configured as separate members. As shown in FIG. 2, on the other hand, one end of the upper case 43 may be integrally formed at a corresponding end of the lower case 42 such that the upper case 43 and the lower case 42 may be hingedly connected to each other.

In addition, as shown in FIGS. 1 and 2, the pouch-shaped battery cell is configured to have a structure in which electrode terminals constituted by the electrode tabs and the electrode leads connected to the electrode tabs are formed at one end of the electrode assembly. Alternatively, a pouch-shaped battery cell configured to have a structure in which electrode terminals are formed at one end and the other end of an electrode assembly may also be manufactured using the above-described method.

DISCLOSURE

Technical Problem

As shown in FIGS. 1 and 2, the electrode assembly is generally manufactured so as to have an approximately rectangular parallelepiped shape. The electrode assembly is mounted in a battery case to manufacture a pouch-shaped battery cell having a rectangular parallelepiped shape. A plurality of pouch-shaped battery cells is stacked to constitute a battery pack having a rectangular parallelepiped shape.

However, a device, to which the battery cell configured to have the rectangular parallelepiped shape or the battery pack configured to have the rectangular parallelepiped shape is applied, is not generally formed to have a rectangular parallelepiped shape. For example, sides of a smartphone may be curved to improve grip.

In a case in which the battery cell having the rectangular parallelepiped shape or the battery pack having the rectangular parallelepiped shape is mounted in a device designed so as to have such curved portions, however, space utilization of the device may be lowered.

That is, the curved portions of the device have dead spaces, in which the battery cell or the battery pack cannot be mounted. Ultimately, such dead spaces lower the capacity of the device per volume.

Therefore, the present invention has been made to solve the above problems, and it is an object of the present invention to provide a stepped electrode group stack that is capable of maximally increasing the capacity of a device per volume and a lithium secondary battery including the same.

Technical Solution

In accordance with one aspect of the present invention, the above and other objects can be accomplished by the provision of an electrode group stack including a stacked structure of electrode groups, each including a positive electrode, a negative electrode, and a separator disposed between the positive electrode and the negative electrode, in which the electrode groups are stacked in a height direction on the basis of a plane such that the positive electrode and the negative electrode face each other in a state in which the separator is disposed between the positive electrode and the negative electrode, wherein the stacked structure of the electrode groups includes electrode groups having different areas at an interface between the electrode groups, and a ratio of capacity to area of the positive electrode and the negative electrode at the interface between the electrode groups (N/P ratio) is equal to or greater than a ratio of capacity to area of a positive electrode and a negative electrode constituting an electrode group having a relatively large area (N/P ratio).

The structure of each of the electrode groups is not particularly restricted so long as each of the electrode groups includes a positive electrode, a negative electrode, and a separator disposed between the positive electrode and the negative electrode. In a concrete example, each of the electrode groups may be a stacked type electrode group, a jelly-roll type electrode group, or a stacked and folded type electrode group.

The stacked type electrode group may include a positive electrode plate, a negative electrode plate, and a plate-shaped separator disposed between the positive electrode plate and the negative electrode plate, and may be configured to have a structure in which the positive electrode plate and the negative electrode plate are stacked in the height direction on the basis of the plane in a state in which the plate-shaped separator is disposed between the positive electrode plate and the negative electrode plate.

The positive electrode plate, the negative electrode plate, and the separation plate may be flat or curved.

The shape of the positive electrode plate, the negative electrode plate, and the separation plate is not particularly restricted. For example, the positive electrode plate, the negative electrode plate, and the separation plate may have a parallelepiped shape. Alternatively, the positive electrode plate, the negative electrode plate, and the separation plate may have a polygonal shape or a circular shape when viewed in a plan view.

Corners of the positive electrode plate, the negative electrode plate, and the separation plate may be right-angled, or at least one of the corners of each of the positive electrode plate, the negative electrode plate, and the separation plate may be curved. For example, at least one of the four corners of the positive electrode plate formed to have a quadrangular shape when viewed in a plan view may be curved. In a case in which at least one of the corners of each of the positive electrode plate, the negative electrode plate, and the separation plate is curved as described above, impact applied to the curved corner of each of the positive electrode plate, the negative electrode plate, and the separation plate may be reduced when the electrode group stack is dropped, thereby improving safety of the electrode group stack.

The stacked type electrode group may be configured to have a structure in which the uppermost electrode and the lowermost electrode have the same polarity. Alternatively, the stacked type electrode group may be configured to have a structure in which the uppermost electrode and the lowermost electrode have different polarities.

Both the uppermost electrode and the lowermost electrode may be positive electrodes or negative electrodes.

In a case in which the uppermost electrode and/or the lowermost electrode is a positive electrode, positive electrode slurry may be applied to only an area of the electrode facing a negative slurry layer.

The stacked and folded type electrode group may include a positive electrode plate, a negative electrode plate, and a one-unit separation sheet disposed between the positive electrode plate and the negative electrode plate, any may be configured to have a structure in which the positive electrode plate and the negative electrode plate are stacked in the height direction on the basis of the plane in a state in which the separation sheet is disposed between the positive electrode plate and the negative electrode plate, and the separation sheet covers sides of the electrode plates at which no electrode terminals are formed.

The stacked and folded type electrode group may be manufactured by winding the separation sheet in a state in which the stacked type electrode groups are disposed on the separation sheet or by folding the separation sheet in a state in which the stacked type electrode groups are disposed on the separation sheet.

The positive electrode plate and the negative electrode plate may be flat or curved. The shape of the positive electrode plate and the negative electrode plate is not particularly restricted. For example, the positive electrode plate and the negative electrode plate may have a parallelepiped shape. Alternatively, the positive electrode plate and the negative electrode plate may have a polygonal shape or a circular shape when viewed in a plan view. Corners of the positive electrode plate and the negative electrode plate may be right-angled, or at least one of the corners of each of the positive electrode plate and the negative electrode plate may be curved. For example, at least one of the four corners of the positive electrode plate formed to have a quadrangular shape when viewed in a plan view may be curved. In a case in which at least one of the corners of each of the positive electrode plate and the negative electrode plate is curved as described above, impact applied to the curved corner of each of the positive electrode plate and the negative electrode plate may be reduced when the electrode group stack is dropped, thereby improving safety of the electrode group stack.

The separation sheet may be defined as a separator disposed between the positive electrode plate and the negative electrode plate for isolating the positive electrode plate and the negative electrode plate from each other and, in addition, having a sufficient length to cover a side of the positive electrode plate at which no positive electrode terminal is formed or a side of the negative electrode plate at which no negative electrode terminal is formed.

Since the separation sheet is disposed between the positive electrode plate and the negative electrode plate in a state in which the separation sheet covers the sides of the electrode terminal plates, it is possible to securely maintain interface contact between the electrode plates and the separation sheet due to repetitive charge and discharge. Specifically, tensile force generated during winding of the separation sheet may provide pressure necessary to achieve tight interface contact between the electrode plates and the separation sheet.

The end of the separation sheet may be fixed by thermal welding or taping.

The jelly-roll type electrode group may include a one-unit positive electrode sheet, a one-unit negative electrode sheet, and a one-unit separation sheet disposed between the positive electrode sheet and the negative electrode sheet, and may be configured to have a structure in which the positive electrode sheet and the negative electrode sheet are wound in a state in which the separation sheet is disposed between the positive electrode sheet and the negative electrode sheet.

The positive electrode sheet, the negative electrode sheet, and the separation sheet may each be defined as a sheet having a sufficient length to wind the positive electrode sheet and the negative electrode sheet in a state in which the separation sheet is disposed between the positive electrode sheet and the negative electrode sheet so as to form a roll.

The electrode groups may be a combination of two or more electrode groups selected from a group consisting of the stacked type electrode group, the jelly-roll type electrode group, and the stacked and folded type electrode group.

The structure and manufacturing method of the stacked type electrode group, the jelly-roll type electrode group, and the stacked and folded type electrode group are well known by a person having ordinary skill in the art to which the present invention pertains, and therefore a further detailed description thereof will be omitted.

The structure and manufacturing method of the stacked type electrode group, the jelly-roll type electrode group, and the stacked and folded type electrode group, which are well known by a person having ordinary skill in the art to which the present invention pertains, are hereby incorporated by reference.

The electrode groups may be stacked in the height direction or in the direction opposite to the height direction on the basis of the plane.

In the above description, the plane may be a ground or a plane perpendicular to the ground. For example, the expression "the electrode groups are stacked in the height direction on the basis of the plane" in the above description may mean that the electrode groups may be stacked from the ground in a direction of gravity or in a direction opposite to gravity. Consequently, the stacked direction of the electrode groups may be the direction of gravity or the direction opposite to gravity. The same is applied to a case in which the electrodes constituting each of the electrode groups are stacked in the height direction on the basis of the plane.

In addition, the electrode groups may be stacked in the height direction and in the direction opposite to the height direction on the basis of the plane. That is, the electrode groups may be stacked from the ground in the direction of gravity and in the direction opposite to gravity. At this time, the electrode groups may be stacked symmetrically or asymmetrically.

The electrode groups are stacked such that the positive electrode and the negative electrode face each other in a state in which the separator is disposed between the positive electrode and the negative electrode.

In a case in which the electrode groups are stacked type electrode groups, the separator may be a separation plate or a separation sheet. The separation sheet may isolate the electrode groups at the interface between the electrode groups and cover the sides of the electrode groups at which no electrode terminals are formed.

At this time, the separation sheet may be spaced apart from each step forming the stepped structure by a predetermined distance. That is, the separation sheet may not be disposed in tight contact with the outer circumference of each step forming the stepped structure.

In this case, it may be difficult to form the outer circumference of a lithium secondary battery including the electrode group stack according to the present invention based on the curvature of a device, in which the lithium secondary battery is mounted.

For this reason, the separation sheet may be disposed in tight contact with the sides of the stacked type electrode groups, specifically the outer circumference of each step forming the stepped structure. The separation sheet may have a thickness of 5 to 300 µm, 5 to 200 µm, 5 to 100 µm, 5 to 50 µm, 5 to 30 µm, 5 to 25 µm, 5 to 20 µm, or 10 to 20 µm. The thinner the thickness of the separation sheet is, the higher the discharge capacity is. The same is applied to the above-described separator.

Since the thickness of the separation sheet is very small as described above, it may not be easy to dispose the separation sheet in tight contact with the outer circumference of each step forming the stepped structure. According to the present invention, the separation sheet may be disposed in tight contact with the outer circumference of each step by cutting, heat treatment, or heat treatment after cutting.

In a case in which the electrode groups are jelly-roll type electrode groups or stacked and folded type electrode groups, an electrode plate may be disposed between the jelly-roll type electrode groups or between the stacked and folded type electrode groups.

When the jelly-roll type electrode groups or the stacked and folded type electrode groups are stacked, the positive electrode and the negative electrode may not face each other at the interface between the electrode groups. In this case, it may take much time and cost to change arrangement of jelly-roll type electrode groups and stacked and folded type electrode groups which have already been manufactured due to structural characteristics of the jelly-roll type electrode groups and the stacked and folded type electrode groups.

In this case, the electrode plate may be disposed between the jelly-roll type electrode groups or between the stacked and folded type electrode groups to improve manufacturing process efficiency.

In the stacked structure of the electrode groups, the stepped structure is formed at the interface between the electrode groups.

In order to form the stepped structure at the interface between the electrode groups, the sizes of the stacked electrode groups or the areas of the electrode groups facing each other at the stack interface between the electrode groups may be different from each other.

For example, the uppermost electrode of the lower one of the stacked electrode groups and the lowermost electrode of the upper one of the stacked electrode groups may have different sizes or areas.

At this time, an electrode having a relatively large size or area may be a negative electrode. As a result, it is possible to minimize dendritic growth during charge and discharge of the lithium secondary battery and to improve safety of the lithium secondary battery including the electrode group stack according to the present invention.

On the other hand, an electrode having a relatively large size or area may be a positive electrode. In a case in which an electrode having a relatively large size or area is a positive electrode, positive electrode slurry may be applied to only an area of the electrode facing a negative slurry layer.

The height and width of each step constituting the stepped structure may be changed based on a curved shape, specifically the curvature, of a device in which the lithium secondary battery including the electrode group stack is mounted.

A ratio of capacity to area of the positive electrode and the negative electrode at the interface between the electrode groups (N/P ratio) is equal to or greater than a ratio of capacity to area of a positive electrode and a negative electrode constituting an electrode group having a relatively large area (N/P ratio).

In a case in which the N/P ratio at the interface between the electrode groups is lower than the N/P ratio of the positive electrode and the negative electrode constituting the electrode group having the relatively large area, the performance of the lithium secondary battery having the electrode group stack according to the present invention mounted therein may be deteriorated, which is not preferable.

A ratio of the N/P ratio of the positive electrode and the negative electrode facing each other at the interface between the electrode groups to the N/P ratio of the positive electrode and the negative electrode constituting each of the electrode groups may be 1:1 to 3:1, 1:1 to 2:1, or 1:1 to 1.5:1.

The N/P ratio may be calculated using Equation 1 below.

Equation (1)

$$N/P \text{ ratio} = \frac{\text{negative electrode charge per unit area (mAh/cm}^2\text{)} \times \text{negative electrode efficiency (\%)}}{\text{Positive electrode design capacity per unit area (mAh/cm}^2\text{)}}$$

Equation (1)

In the above equation, negative electrode charge capacity per unit area=negative electrode loading level per unit area (g/cm$^2$)×negative electrode active material rate (%)×negative electrode charge capacity per unit weight (mAh/g), negative electrode efficiency=(negative electrode discharge capacity/negative electrode charge capacity)×100, positive electrode design capacity per unit area=design capacity/coated positive electrode area, and design capacity=positive electrode loading level (g/cm$^2$)×positive electrode active material rate (%)×positive electrode charge capacity per unit weight (mAh/g)−irreversible negative electrode capacity (mAh).

Positive electrode charge capacity per unit weight, negative electrode charge capacity per unit weight, negative electrode discharge capacity, and irreversible negative electrode capacity may be measured using the following methods.

1) A method of measuring a positive electrode charge capacity per unit weight: A half cell is prepared as a positive electrode to be evaluated, an opposite electrode is formed of lithium metal, capacity of the half cell is measured when charging is performed at low rate control (after 0.2 C), and the measured capacity is normalized by weight of the half cell.

2) A method of measuring a negative electrode charge capacity per unit weight: A half cell is prepared as a negative electrode to be evaluated, an opposite electrode is formed of lithium metal, capacity of the half cell is measured when charging is performed at low rate control (after 0.2 C), and the measured capacity is normalized by weight of the half cell.

3) A method of measuring a negative electrode discharge capacity per unit weight: A half cell is prepared as a negative electrode to be evaluated, an opposite electrode is formed of lithium metal, capacity of the half cell is measured at the time of discharging after charging is performed at low rate control (after 0.2 C), and the measured capacity is normalized by weight of the half cell.

4) A method of measuring an irreversible negative electrode capacity per unit weight: The difference between capacities at the time of charging and discharging a negative electrode half cell once is measured.

5) Definition of a negative electrode loading level per unit area: Weight of a negative electrode active material coated on a negative electrode current collector per unit area.

6) Definition of a positive electrode loading level per unit area: Weight of a positive electrode active material coated on a positive electrode current collector per unit area.

In a concrete embodiment configured such that the N/P ratio at the interface between the electrode groups is higher than the N/P ratio of the positive electrode and the negative electrode constituting the electrode group having the relatively large area, a loading level of a positive electrode constituting an (n+1)-th electrode group and a loading level of a positive electrode constituting an n-th electrode group may be equal, and a loading level of a negative electrode constituting the (n+1)-th electrode group may be higher than that of a negative electrode constituting the n-th electrode group.

In addition, the loading level of the negative electrode constituting the (n+1)-th electrode group and the loading level of the negative electrode constituting the n-th electrode group may be equal, and the loading level of the positive electrode constituting the n-th electrode group may be higher than that of the positive electrode constituting the (n+1)-th electrode group.

At this time, the size or area of the electrodes constituting the n-th electrode group may be greater than that of the electrodes constituting the (n+1)-th electrode group.

In another concrete embodiment configured such that the N/P ratio at the interface between the electrode groups is higher than the N/P ratio of the positive electrode and the negative electrode constituting each of the electrode groups, a loading level of a positive electrode constituting an (n−1)-th electrode group, a loading level of a positive electrode constituting an n-th electrode group, and a loading level of a positive electrode constituting an (n+1)-th electrode group may be equal, a loading level of a negative electrode constituting the (n−1)-th electrode group and a loading level of a negative electrode constituting the (n+1)-th electrode group may be higher than that of a negative electrode constituting the n-th electrode group.

In addition, the loading level of the negative electrode constituting the (n−1)-th electrode group, the loading level of the negative electrode constituting the n-th electrode group, and the loading level of the negative electrode constituting the (n+1)-th electrode group may be equal, and the loading level of the positive electrode constituting the n-th electrode group may be higher than that of the positive electrode constituting the (n−1)-th electrode group and that of the positive electrode constituting the (n+1)-th electrode group.

In this case, a ratio of the N/P ratio of the positive electrode and the negative electrode constituting the n-th electrode group to the N/P ratio of the positive electrode and the negative electrode constituting the (n+1)-th electrode group stacked on the n-th electrode group in the height direction on the basis of the plane may be 1:1, and a ratio of the N/P ratio of the positive electrode and the negative electrode constituting the n-th electrode group to the N/P ratio of the positive electrode and the negative electrode constituting the (n−1)-th electrode group stacked on the n-th electrode group in the direction opposite to the height direction on the basis of the plane may be 1:1.

At this time, the size or area of the electrodes constituting the n-th electrode group may be greater than that of the electrodes constituting the (n−1)-th electrode group and that of the electrodes constituting the (n+1)-th electrode group.

As long as the N/P ratio at the interface between the electrode groups is equal to or higher than the N/P ratio of the positive electrode and the negative electrode constituting the electrode group having the relatively large area, an N/P ratio of a positive electrode and a negative electrode constituting an electrode group having a relatively small area may be equal to or greater than that of the positive electrode and the negative electrode constituting the electrode group having the relatively large area.

In addition, as long as the N/P ratio at the interface between the electrode groups is equal to or higher than the N/P ratio of the positive electrode and the negative electrode constituting the electrode group having the relatively large area, a loading level of the negative electrode constituting the electrode group having the relatively small area may be equal to or greater than that of the negative electrode constituting the electrode group having the relatively large area.

Furthermore, as long as the N/P ratio at the interface between the electrode groups is equal to or higher than the N/P ratio of the positive electrode and the negative electrode constituting the electrode group having the relatively large area, a loading level of the positive electrode constituting the electrode group having the relatively small area may be equal to or less than that of the positive electrode constituting the electrode group having the relatively large area.

Under the condition that the electrodes have the same porosity, the loading levels of the electrodes may be checked based on the thicknesses of the electrodes. The thicknesses of the electrodes may be checked using ion milling.

On the other hand, in a case in which the electrode groups are jelly-roll type electrode groups or stacked and folded type electrode groups, an N/P ratio of an electrode plate disposed between the jelly-roll type electrode groups or the stacked and folded type electrode groups and the positive electrode and the negative electrode at the interface between the electrode groups may be equal to or greater than that of a positive electrode and a negative electrode constituting an electrode group having a larger area than the electrode plate.

In accordance with other aspects of the present invention, there are provided a lithium secondary battery including the electrode group stack with the above-stated construction mounted in a battery case and a device using the lithium secondary battery as a power source.

The device may be a mobile phone, a portable computer, a smart phone, a smart pad, a netbook computer, a light electronic vehicle (LEV), an electric vehicle, a hybrid electric vehicle, a plug-in hybrid electric vehicle, or a power storage device.

The structure, components, and manufacturing method of the lithium secondary battery are well known by a person having ordinary skill in the art to which the present invention pertains, and therefore a further detailed description thereof will be omitted.

The structure, components, and manufacturing method of the lithium secondary battery, which are well known by a person having ordinary skill in the art to which the present invention pertains, are hereby incorporated by reference.

DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 3:
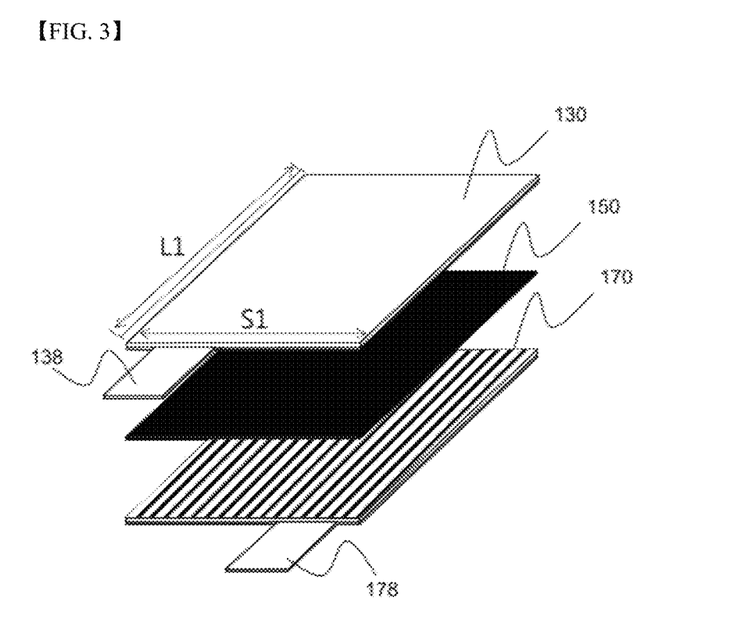
FIGS. 3 and 4 are a perspective view and a vertical sectional view typically showing electrode plates and a separation plate constituting a stacked type electrode group according to the present invention.
Figure 4:
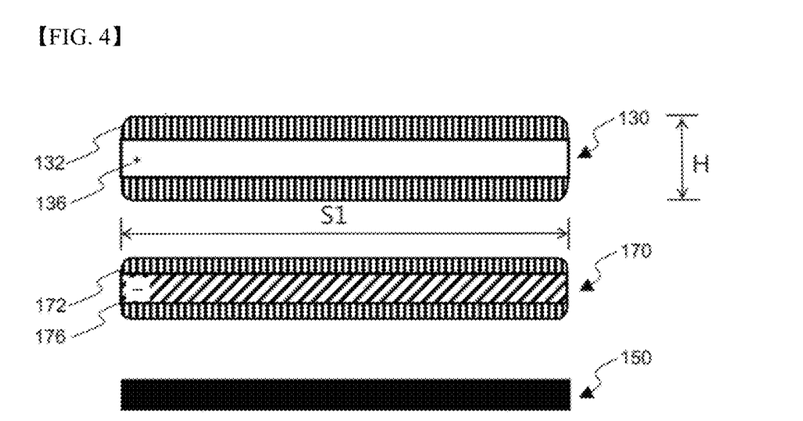

A positive electrode plate 130, a negative electrode plate 170, and a separation plate 150 constituting an electrode assembly according to the present invention are typically shown in FIGS. 3 and 4. Referring to FIGS. 3 and 4, the positive electrode plate 130 is configured to have a structure in which positive electrode slurry 132 is applied to a positive electrode current collector 136, and the negative electrode plate 170 is configured to have a structure in which negative electrode slurry 172 is applied to a negative electrode current collector 176.

In the positive electrode plate 130 of FIG. 3, the positive electrode slurry 132 is applied to the top and bottom of the positive electrode current collector 136. In the negative electrode plate 170, the negative electrode slurry 172 is applied to the top and bottom of the negative electrode current collector 176. The positive electrode plate 130 and the negative electrode plate 170 of FIGS. 3 and 4 are formed to have a rectangular parallelepiped shape having an overall length L1, an overall width S1, and an overall height H.

Figure 5:
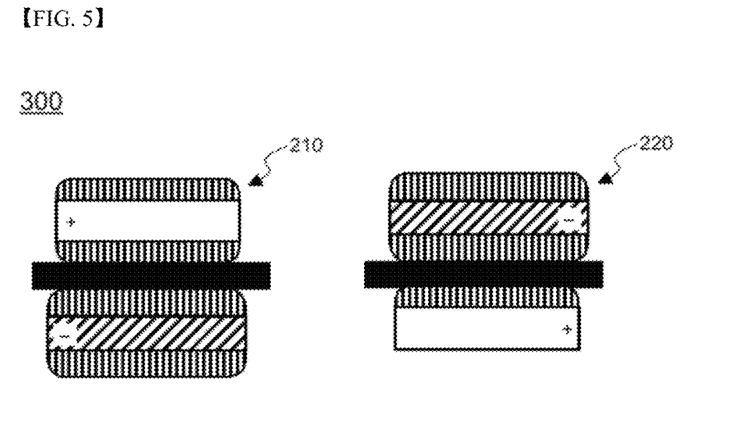
FIGS. 5 and 6 are vertical sectional views typically showing stacked type electrode groups each configured to have a structure in which the uppermost electrode plate and the lowermost electrode plate have different polarities.
Figure 6:
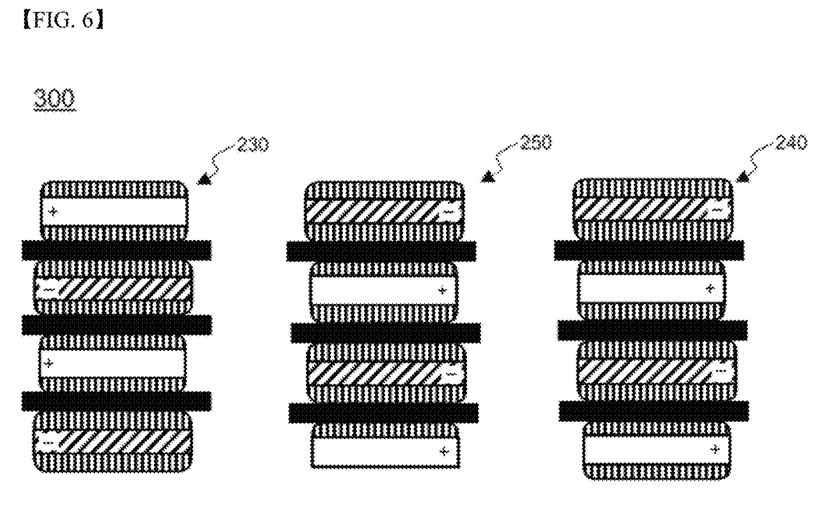
Figure 7:
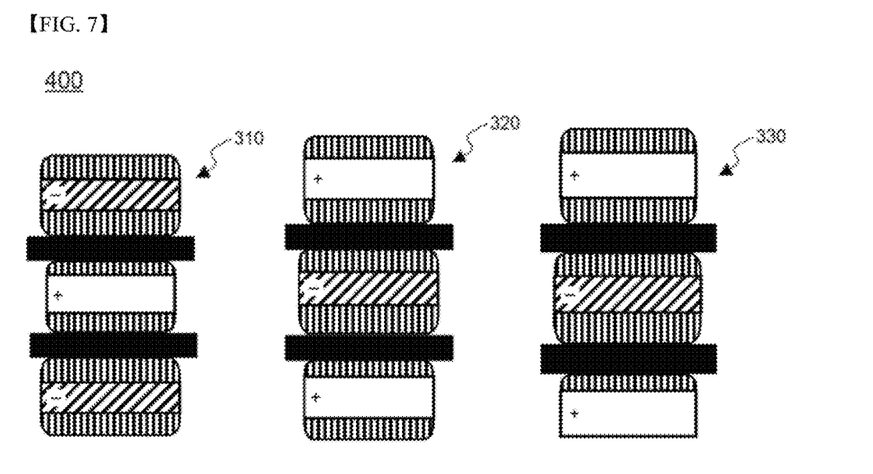
FIG. 7 is a vertical sectional view typically showing stacked type electrode groups each configured to have a structure in which the uppermost electrode plate and the lowermost electrode plate have the same polarity.

FIGS. 5 to 7 are vertical sectional views typically showing stacked type electrode groups 300 and 400 configured to have a structure in which the positive electrode plate 130 and the negative electrode plate 170 of FIG. 4 are alternately stacked in a height direction on the basis of a plane parallel to a stack plane in a state in which the separation plate 150 is disposed between the positive electrode plate 130 and the negative electrode plate 170.

In stacked type electrode groups 210, 220, 230, 240, and 250 of FIGS. 5 and 6, the uppermost electrode plate and the lowermost electrode plate have different polarities. In stacked type electrode groups 310, 320, and 330 of FIG. 7, on the other hand, the uppermost electrode plate and the lowermost electrode plate have the same polarity.

In the stacked type electrode groups 220, 250, and 330, positive electrode slurry is applied to only one major surface of the lowermost positive electrode plate facing the negative electrode plate stacked on the lowermost positive electrode plate.

Figure 8:
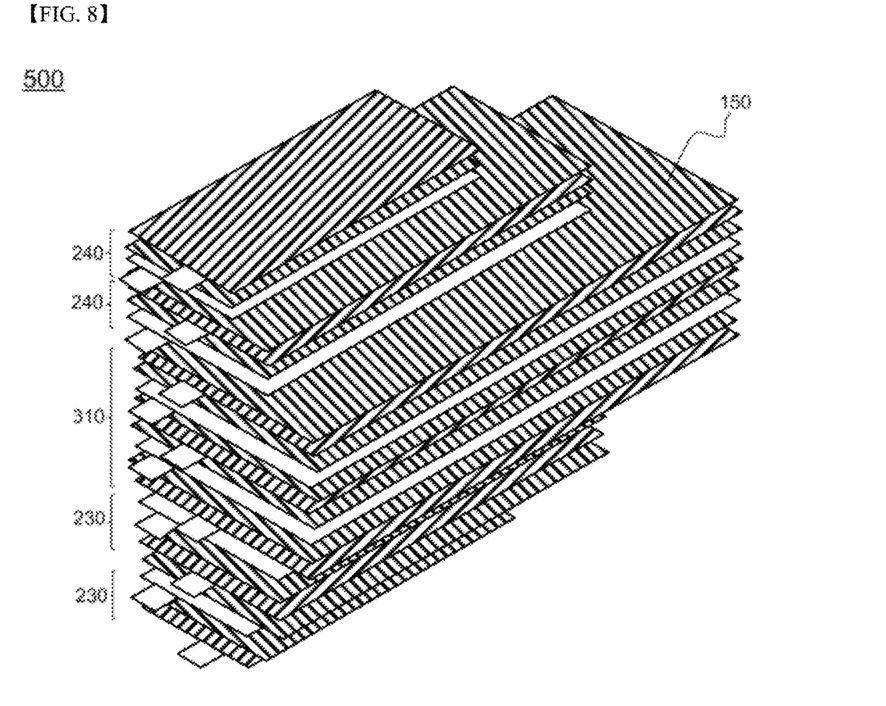
FIG. 8 is a perspective view showing an electrode group stack according to an embodiment of the present invention.

FIG. 8 is a perspective view showing an electrode group stack according to an embodiment of the present invention. Referring to this figure, stacked type electrode groups 230, 240, and 310 having different sizes or areas are stacked. A stepped structure is formed at interfaces among the stacked type electrode groups 230 and 310. In addition, another stepped structure is formed at interfaces among the stacked type electrode groups 240 and 310.

Figure 9:
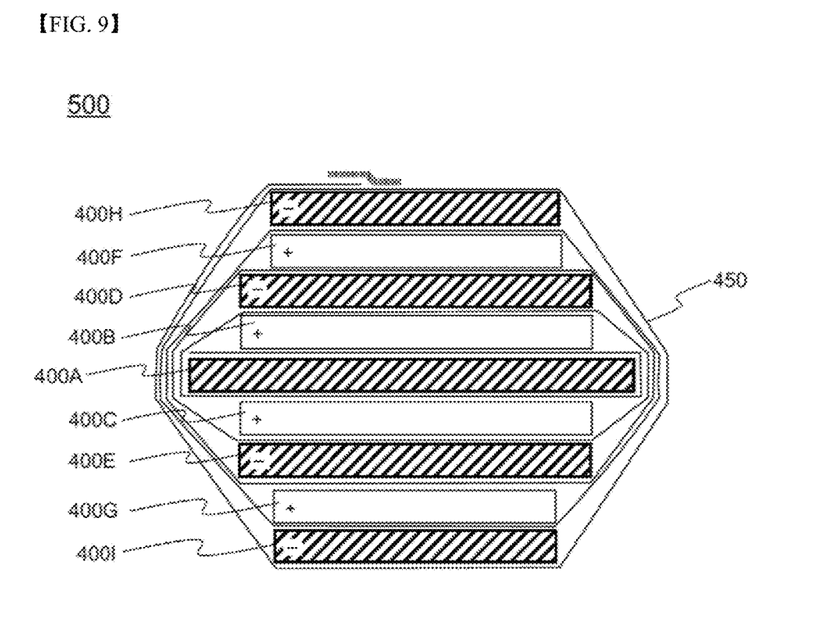
FIG. 9 is a vertical sectional view typically showing an electrode group stack according to another embodiment of the present invention.

FIG. 9 is a vertical sectional view typically showing an electrode group stack according to another embodiment of the present invention.

Referring to this figure, electrode groups 400A, 400B, 400C, 400D, 400E, 400F, 400G, 400H, and 400I, each configured to have a structure in which the uppermost electrode plate and the lowermost electrode plate have the same polarity, are stacked in both directions, i.e. a height direction and a direction opposite to the height direction.

Specifically, the stacked type electrode groups 400I and 400G having the same size or area are sequentially stacked on the lowermost end of the electrode group stack. The stacked type electrode groups 400E and 400C having a larger size or area than the stacked type electrode groups 400I and 400G are sequentially stacked on the stacked type electrode groups 400I and 400G. The stacked type electrode group 400A having a larger size or area than the stacked type electrode groups 400E and 400C is stacked on the stacked type electrode groups 400E and 400C. The stacked type electrode groups 400B and 400D having a smaller size or area than the stacked type electrode group 400A are sequentially stacked on the stacked type electrode group 400A. The stacked type electrode groups 400F and 400H having a smaller size or area than the stacked type electrode groups 400B and 400D are sequentially stacked on the stacked type electrode groups 400B and 400D.

The sides of the stacked type electrode groups 400I, 400G, 400E, 400C, 400A, 400B, 400D, 400F, and 400H are covered by a separation sheet 450, and electrode terminals (not shown) are formed in a direction protruding from the figure. The outer circumference of a stack constituted by the stacked type electrode groups 400I, 400G, 400E, 400C, 400A, 400B, 400D, 400F, and 400H is also covered by the separation sheet 450.

After the outer circumference of the stack constituted by the stacked type electrode groups 400I, 400G, 400E, 400C, 400A, 400B, 400D, 400F, and 400H is covered by the separation sheet 450, the separation sheet 450 may be fixed by thermal welding or taping.

As shown in FIG. 9, the separation sheet 450 is fixed by taping after the outer circumference of the stack is covered by the separation sheet 450.

Figure 10:
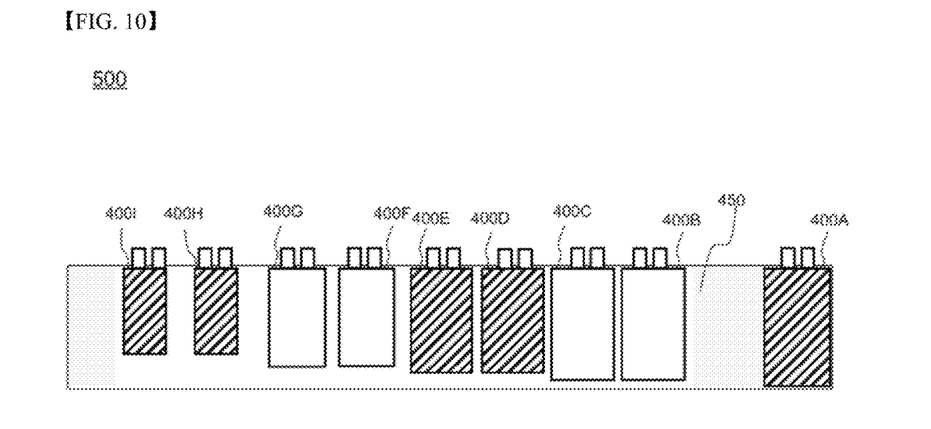
FIG. 10 is a development view typically showing the electrode group stack of FIG. 9.

FIG. 10 is a development view typically showing the electrode group stack of FIG. 9.

Referring to this figure, the electrode group 400A having the largest size or area is disposed on the right edge of the separation sheet at which winding of the separation sheet is commenced. The electrode groups 400B and 400C having a smaller size or area than the electrode group 400A is disposed on the separation sheet in a winding direction in a state in which the electrode groups 400B and 400C are spaced apart from the electrode group 400A by a predetermined distance. The electrode groups 400D and 400E having a smaller size or area than the electrode groups 400B and 400C are disposed on the separation sheet in the winding direction in a state in which the electrode groups 400D and 400E are spaced apart from the electrode group 400C by a predetermined distance. The electrode groups 400F and 400G having a smaller size or area than the electrode groups 400D and 400E are disposed on the separation sheet in the winding direction in a state in which the electrode groups 400F and 400G are spaced apart from the electrode group 400E by a predetermined distance. The electrode groups 400H and 400I having a smaller size or area than the electrode groups 400F and 400G are disposed on the separation sheet in the winding direction in a state in which the electrode groups 400H and 400I are spaced apart from the electrode group 400G by a predetermined distance.

The electrode groups 400A, 400B, 400C, 400D, 400E, 400F, 400G, 400H, and 400I arranged as described above are wound in the winding direction from the electrode group 400A located at a winding start point to the electrode group 400I located at a winding end point. As a result, the electrode group stack is formed as shown in FIG. 9.

One corner of each of the stacked type electrode groups 400A, 400B, 400C, 400D, 400E, 400F, 400G, 400H, and 400I of FIG. 10 is curved when viewed in a plan view.

Of course, even in a case in which the corners of the stacked type electrode groups 400A, 400B, 400C, 400D, 400E, 400F, 400G, 400H, and 400I are right-angled when viewed in a plan view, the stacked type electrode groups 400A, 400B, 400C, 400D, 400E, 400F, 400G, 400H, and 400I may be arranged as shown in FIG. 10 to manufacture the electrode group stack of FIG. 9.

EXAMPLE

Positive electrode plates and negative electrode plates were manufactured as indicated in Tables 1 to 1 below to manufacture an electrode group stack according to an embodiment of the present invention.

TABLE 1

| Positive electrodes | | | | |
| --- | --- | --- | --- | --- |
| | Thickness mm | Porosity % | Loading level mg/cm$^2$ | Reversible capacity mAh |
| Positive electrode A | 100 | 21 | 16.8 | 335 |
| Positive electrode B | 110 | 21 | 18.8 | 375 |

TABLE 2

| Negative electrodes | | | | |
| --- | --- | --- | --- | --- |
| | Thickness mm | Porosity % | Loading level mg/cm2 | Reversible capacity mAh |
| Negative electrode A | 105 | 27 | 7.76 | 348 |
| Negative electrode B | 108 | 27 | 8 | 359 |
| Negative electrode C | 110 | 27 | 8.24 | 369 |
| Negative electrode D | 118.8 | 27 | 8.92 | 400 |
| Negative electrode E | 90 | 27 | 6.56 | 294 |

TABLE 3

| | | First step positive electrode | First step negative electrode | Thickness ratio of first step negative electrode to first step positive electrode | Second step positive electrode | Second step negative electrode | Thickness ratio of second step negative electrode to second step positive electrode | Third step positive electrode | Third step negative electrode | Thickness ratio of third step negative electrode to third step positive electrode | Thickness ratio of first step negative electrode and positive electrode to second step negative electrode and positive electrode | Thickness ratio of second step negative electrode and positive electrode to third step negative electrode and positive electrode |
|---|---|---|---|---|---|---|---|---|---|---|---|---|
| Examples | 1 | Positive electrode A | Negative electrode A | 1.05 | Positive electrode A | Negative electrode A | 1.05 | | | | 1.05 | |
| | 2 | Positive electrode A | Negative electrode A | 1.05 | Positive electrode A | Negative electrode B | 1.08 | | | | 1.05 | |
| | 3 | Positive electrode A | Negative electrode A | 1.05 | Positive electrode A | Negative electrode B | 1.08 | Positive electrode A | Negative electrode C | 1.10 | 1.05 | 1.08 |
| | 4 | Positive electrode A | Negative electrode A | 1.05 | Positive electrode A | Negative electrode C | 1.10 | Positive electrode A | Negative electrode B | 1.08 | 1.05 | 1.1 |
| Comparative examples | 1 | Positive electrode A | Negative electrode B | 1.08 | Positive electrode B | Negative electrode D | 1.08 | | | | 0.98 | |
| | 2 | Positive electrode A | Negative electrode E | 0.90 | Positive electrode A | Negative electrode A | 1.05 | | | | 1.08 | |

EXPERIMENTAL EXAMPLE

Figure 11:
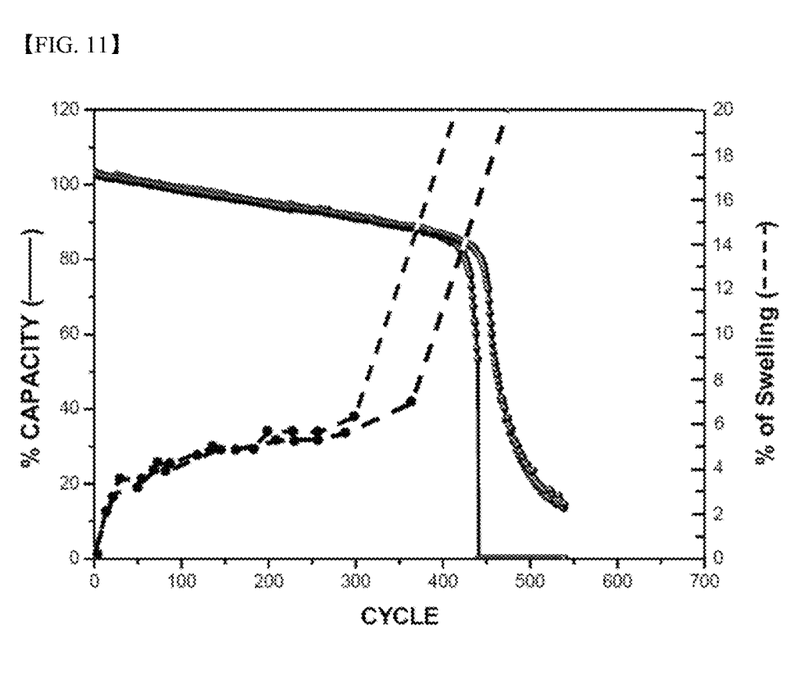
FIG. 11 is a graph showing comparison in cycle characteristics between an example of the present invention and a comparative example.

Lithium secondary batteries having electrode group stacks according to Examples and Comparative examples mounted therein were repeatedly charged and discharged 500 times at a temperature of 25° C. The results are indicated in FIG. 11.

It can be seen that electric capacities of the lithium secondary batteries after the lithium secondary batteries are charged and discharged 500 times are 60% or more those of the lithium secondary batteries after the lithium secondary batteries are charged and discharged once and that the rate of thickness change of electrode assemblies is 15% or less.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the electrode group stack according to the present invention includes a stepped structure changed based on the curvature of a device. Consequently, the present invention has an effect of increasing the capacity of the device per volume by utilizing a dead space defined in the device unlike a conventional electrode assembly.

The invention claimed is:

1. An electrode group stack comprising a stacked structure of electrode groups, each comprising a positive electrode, a negative electrode, and a separator disposed between the positive electrode and the negative electrode, in which the electrode groups are stacked in a height direction on the basis of a plane such that the positive electrode and the negative electrode face each other in a state in which the separator is disposed between the positive electrode and the negative electrode, wherein
the stacked structure of the electrode groups comprises electrode groups having different areas at an interface between the electrode groups,
a ratio of capacity to area of the positive electrode and the negative electrode at the interface between the electrode groups (N/P ratio) is equal to or greater than a ratio of capacity to area of a positive electrode and a negative electrode constituting an electrode group having a larger area (N/P ratio), and
the (N/P ratio) is calculated using the following equation:

$$\frac{\text{negative electrode charge capacity per unit area (mAh/cm}^2) \times \text{negative electrode efficiency (\%)}}{\text{Positive electrode design capacity per unit area (mAh/cm}^2)}.$$

2. The electrode group stack according to claim 1, wherein the electrode groups are stacked in the height direction and in a direction opposite to the height direction on the basis of the plane.

3. The electrode group stack according to claim 1, wherein a loading level of a positive electrode constituting an (n+1)-th electrode group and a loading level of a positive electrode constituting an n-th electrode group are equal, and a loading level of a negative electrode constituting the (n+1)-th electrode group is higher than a loading level of a negative electrode constituting the n-th electrode group.

4. The electrode group stack according to claim 1, wherein a loading level of a negative electrode constituting an (n+1)-th electrode group and a loading level of a negative electrode constituting an n-th electrode group are equal, and a loading level of a positive electrode constituting the n-th electrode group is higher than a loading level of a positive electrode constituting the (n+1)-th electrode group.

5. The electrode group stack according to claim 3, wherein a ratio of the N/P ratio of the positive electrode and the negative electrode constituting the n-th electrode group to the N/P ratio of the positive electrode and the negative electrode constituting the (n+1)-th electrode group stacked on the n-th electrode group in the height direction on the basis of the plane is 1:1.

6. The electrode group stack according to claim 2, wherein a loading level of a positive electrode constituting an (n−1)-th electrode group, a loading level of a positive electrode constituting an n-th electrode group, and a loading level of a positive electrode constituting an (n+1)-th electrode group are equal, a loading level of a negative electrode constituting the (n−1)-th electrode group is higher than a loading level of a negative electrode constituting the n-th electrode group, and a loading level of a negative electrode constituting the (n+1)-th electrode group is higher than the loading level of the negative electrode constituting the n-th electrode group.

7. The electrode group stack according to claim 2, wherein a loading level of a negative electrode constituting an (n−1)-th electrode group, a loading level of a negative electrode constituting an n-th electrode group, and a loading level of a negative electrode constituting an (n+1)-th electrode group are equal, and a loading level of a positive electrode constituting the n-th electrode group is higher than a loading level of a positive electrode constituting the (n−1)-th electrode group and a loading level of a positive electrode constituting the (n+1)-th electrode group.

8. The electrode group stack according to claim 6, wherein
  a ratio of the N/P ratio of the positive electrode and the negative electrode constituting the n-th electrode group to the N/P ratio of the positive electrode and the negative electrode constituting the (n+1)-th electrode group stacked on the n-th electrode group in the height direction on the basis of the plane is 1:1, and
  a ratio of the N/P ratio of the positive electrode and the negative electrode constituting the n-th electrode group to the N/P ratio of the positive electrode and the negative electrode constituting the (n−1)-th electrode group stacked on the n-th electrode group in the direction opposite to the height direction on the basis of the plane is 1:1.

9. The electrode group stack according to claim 1, wherein a ratio of the N/P ratio of the positive electrode and the negative electrode facing at the interface between the electrode groups to the N/P ratio of the positive electrode and the negative electrode constituting each of the electrode groups is 1:1 to 3:1.

10. The electrode group stack according to claim 9, wherein the ratio of the N/P ratio of the positive electrode and the negative electrode facing at the interface between the electrode groups to the N/P ratio of the positive electrode and the negative electrode constituting each of the electrode groups is 1:1 to 2:1.

11. The electrode group stack according to claim 10, wherein the ratio of the N/P ratio of the positive electrode and the negative electrode facing at the interface between the electrode groups to the N/P ratio of the positive electrode and the negative electrode constituting each of the electrode groups is 1:1 to 1.5:1.

12. The electrode group stack according to claim 1, wherein each of the electrode groups is a stacked type electrode group, comprising a positive electrode plate, a negative electrode plate, and a plate-shaped separator disposed between the positive electrode plate and the negative electrode plate, which is configured to have a structure in which the positive electrode plate and the negative electrode plate are stacked in the height direction on the basis of the plane in a state in which the separator is disposed between the positive electrode plate and the negative electrode plate.

13. The electrode group stack according to claim 12, wherein the stacked type electrode group is configured to have a structure in which an uppermost electrode and a lowermost electrode have the same polarity.

14. The electrode group stack according to claim 12, wherein the stacked type electrode group is configured to have a structure in which an uppermost electrode and a lowermost electrode have different polarities.

15. The electrode group stack according to claim 12, wherein the separator disposed between the stacked type electrode groups is a separation plate.

16. The electrode group stack according to claim 12, wherein the separator disposed between the stacked type electrode groups is a one-unit separation sheet, and the separation sheet covers sides of the stacked type electrode groups at which no electrode terminals are formed.

17. The electrode group stack according to claim 16, wherein the separation sheet is in tight contact with the sides of the stacked type electrode groups.

18. The electrode group stack according to claim 1, wherein each of the electrode groups is a jelly-roll type electrode group, comprising a one-unit positive electrode sheet, a one-unit negative electrode sheet, and a one-unit separation sheet disposed between the positive electrode sheet and the negative electrode sheet, which is configured to have a structure in which the positive electrode sheet and the negative electrode sheet are wound in a state in which the separation sheet is disposed between the positive electrode sheet and the negative electrode sheet.

19. The electrode group stack according to claim 18, wherein an electrode plate is disposed between the jelly-roll type electrode groups, and an N/P ratio of the positive electrode and the negative electrode at an interface between each of the electrode groups and the electrode plate is equal to or higher than an N/P ratio of the positive electrode and the negative electrode constituting each of the jelly-roll type electrode groups having a larger area than the electrode plate.

20. The electrode group stack according to claim 1, wherein each of the electrode groups is a stacked and folded type electrode group, comprising a positive electrode plate, a negative electrode plate, and a one-unit separation sheet disposed between the positive electrode plate and the negative electrode plate, which is configured to have a structure in which the positive electrode plate and the negative electrode plate are stacked in the height direction on the basis of the plane in a state in which the separation sheet is disposed between the positive electrode plate and the negative electrode plate, and the separation sheet covers sides of the electrode plates at which no electrode terminals are formed.

21. The electrode group stack according to claim 20, wherein an electrode plate is disposed between the stacked and folded type electrode groups, and an N/P ratio of the positive electrode and the negative electrode at an interface between each of the electrode groups and the electrode plate is equal to or higher than an N/P ratio of the positive electrode and the negative electrode constituting each of the stacked and folded type electrode groups having a larger area than the electrode plate.

22. The electrode group stack according to claim 1, wherein the electrode groups are two or more selected from a group consisting of a stacked type electrode group, a jelly-roll type electrode group, and a stacked and folded type electrode group.

23. The electrode group stack according to claim 2, wherein the electrode groups are stacked symmetrically or asymmetrically.

24. The electrode group stack according to claim 1, wherein an N/P ratio of a positive electrode and a negative electrode constituting an electrode group having a small area is equal to or greater than the N/P ratio of the positive electrode and the negative electrode constituting the electrode group having the larger area.

25. The electrode group stack according to claim 1, wherein a loading level of a negative electrode constituting an electrode group having a small area is equal to or greater than a loading level of the negative electrode constituting the electrode group having the larger area.

26. The electrode group stack according to claim 1, wherein a loading level of a positive electrode constituting an electrode group having a small area is equal to or less than a loading level of the positive electrode constituting the electrode group having the larger area.

27. A lithium secondary battery comprising an electrode group stack according to claim 1 mounted in a battery case.

28. A device using a lithium secondary battery according to claim 27 as a power source.

29. The device according to claim 28, wherein the device is a mobile phone, a portable computer, a smart phone, a smart pad, a netbook computer, a light electronic vehicle (LEV), an electric vehicle, a hybrid electric vehicle, a plug-in hybrid electric vehicle, or a power storage device.

* * * * *